United States Patent
Sikora et al.

(10) Patent No.: US 9,414,446 B2
(45) Date of Patent: Aug. 9, 2016

(54) ELECTRONICS CASE WITH ELECTROLUMINESCENT PANEL

(71) Applicants: Matthew C. Sikora, Reno, NV (US); Matthew S. Burns, Reno, NV (US)

(72) Inventors: Matthew C. Sikora, Reno, NV (US); Matthew S. Burns, Reno, NV (US)

( * ) Notice: Subject to any disclaimer, the term of this patent is extended or adjusted under 35 U.S.C. 154(b) by 629 days.

(21) Appl. No.: 13/781,836

(22) Filed: Mar. 1, 2013

(65) Prior Publication Data

US 2013/0260835 A1    Oct. 3, 2013

Related U.S. Application Data

(60) Provisional application No. 61/617,044, filed on Mar. 29, 2012.

(51) Int. Cl.
*H04M 1/00* (2006.01)
*H05B 33/08* (2006.01)
*H04W 88/02* (2009.01)

(52) U.S. Cl.
CPC ........... *H05B 33/0803* (2013.01); *H04W 88/02* (2013.01); *H05B 33/08* (2013.01); *Y02B 20/325* (2013.01)

(58) Field of Classification Search
CPC ... H05B 33/0803; H05B 33/08; H04W 88/02; Y02B 20/325

USPC ........................................ 455/575.8; 345/102
See application file for complete search history.

(56) References Cited

U.S. PATENT DOCUMENTS

| | | | | |
|---|---|---|---|---|
| 2004/0204014 | A1* | 10/2004 | Colorado | H04M 1/72547 455/550.1 |
| 2005/0073829 | A1* | 4/2005 | Burger | H05B 33/08 362/84 |
| 2009/0267522 | A1* | 10/2009 | Nakamura | G06F 1/1616 315/136 |

* cited by examiner

*Primary Examiner* — Yuwen Pan
*Assistant Examiner* — Fatuma Sherif
(74) *Attorney, Agent, or Firm* — Marc. D. Foodman; Ferdinand IP

(57) ABSTRACT

An electronics case for a portable electronic device with an electroluminescent panel ("ELP") for displaying light patterns in response to sound, vibration or other input signals. The case includes an integrated control circuit for receiving input signals from an input device and, in response, generating a set of ELP pattern signals that are transmitted to the ELP. The integrated control circuit also includes a power supply connected to the controller for supplying power to the integrated control circuit and the ELP. The ELP comprises a plurality of segments and it is affixed to the exterior surface of the case to attract attention to the light patterns as they are being displayed on the ELP.

20 Claims, 7 Drawing Sheets

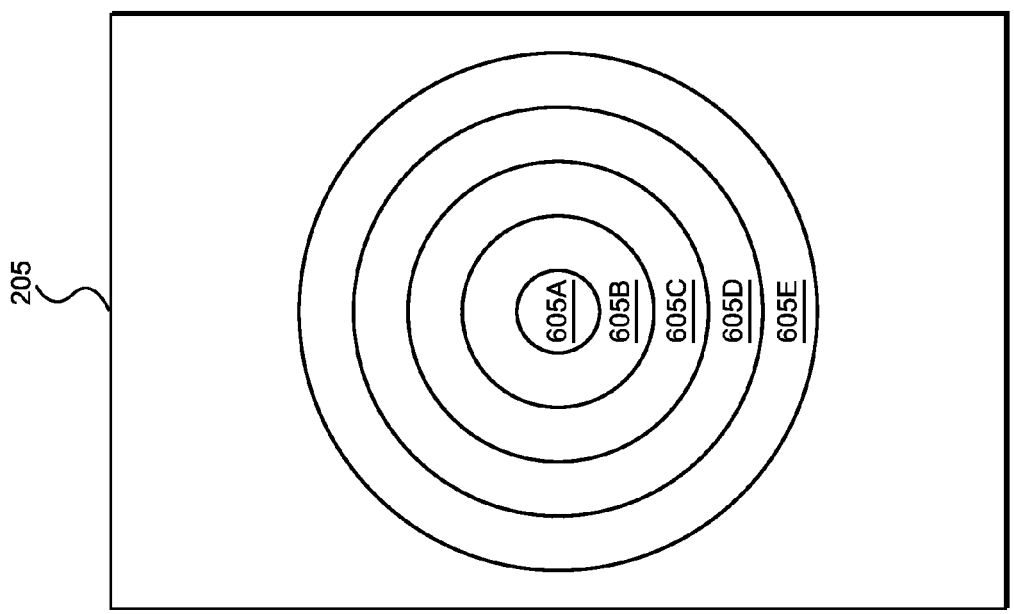

ELECTRONICS CASE WITH ELECTROLUMINESCENT PANEL

RELATED APPLICATION INFORMATION

This application claims priority benefit from U.S. Provisional Application No. 61/617,044, filed on Mar. 29, 2012.

BACKGROUND

With the explosion of portable electronic devices ("PEDs") such as mobile phones, smartphones, laptop computers, tablet computers, netbook computers, music players, electronic readers, gaming devices, GPS devices, cameras, and a host of types of PEDs over the past several years, the need to protect those devices has spawned an industry for designing and manufacturing cases of all types to protect and enhance the exterior chassis of the device and the fragile internal components in the event that the device is dropped, thrown, squashed, stepped on, submerged, exposed to heat or cold, or otherwise mishandled in any number of ways.

Electronics cases for PEDs come in all sizes and shapes depending on the particular purpose for which they are intended. They are also manufactured using a variety of materials that are best suited for a particular purpose. In addition to protecting the PED, conventional electronics cases that are currently on the market may also be decorative, add storage or prolong battery life.

Currently available cases offer a wide variety of decorative flourishes. For example, cases can be ordered with custom ornamental features that are selected or even designed by the consumer to his or her own tastes. As consumers develop greater reliance upon, and become more and more attached to their PEDs, they expect an even higher level of customization for their PEDs, including with respect to the cases. At present, cases are restricted to a static experience where a case with a particular design is purchased and it does not change. While a consumer may buy more than one case, each with different ornamental designs or functional features for different occasions, there are currently no cases that provide a unique interactive experience for the user manifested in the case and expressing his or her own personality depending on how they feel or the mood or message they want to convey at any given time.

BRIEF DESCRIPTION OF THE DRAWINGS

FIGS. 6A-B are diagrams showing an electroluminescent panel of the PED case of the present invention in different illumination patterns.

DETAILED DESCRIPTION

Figure 1:
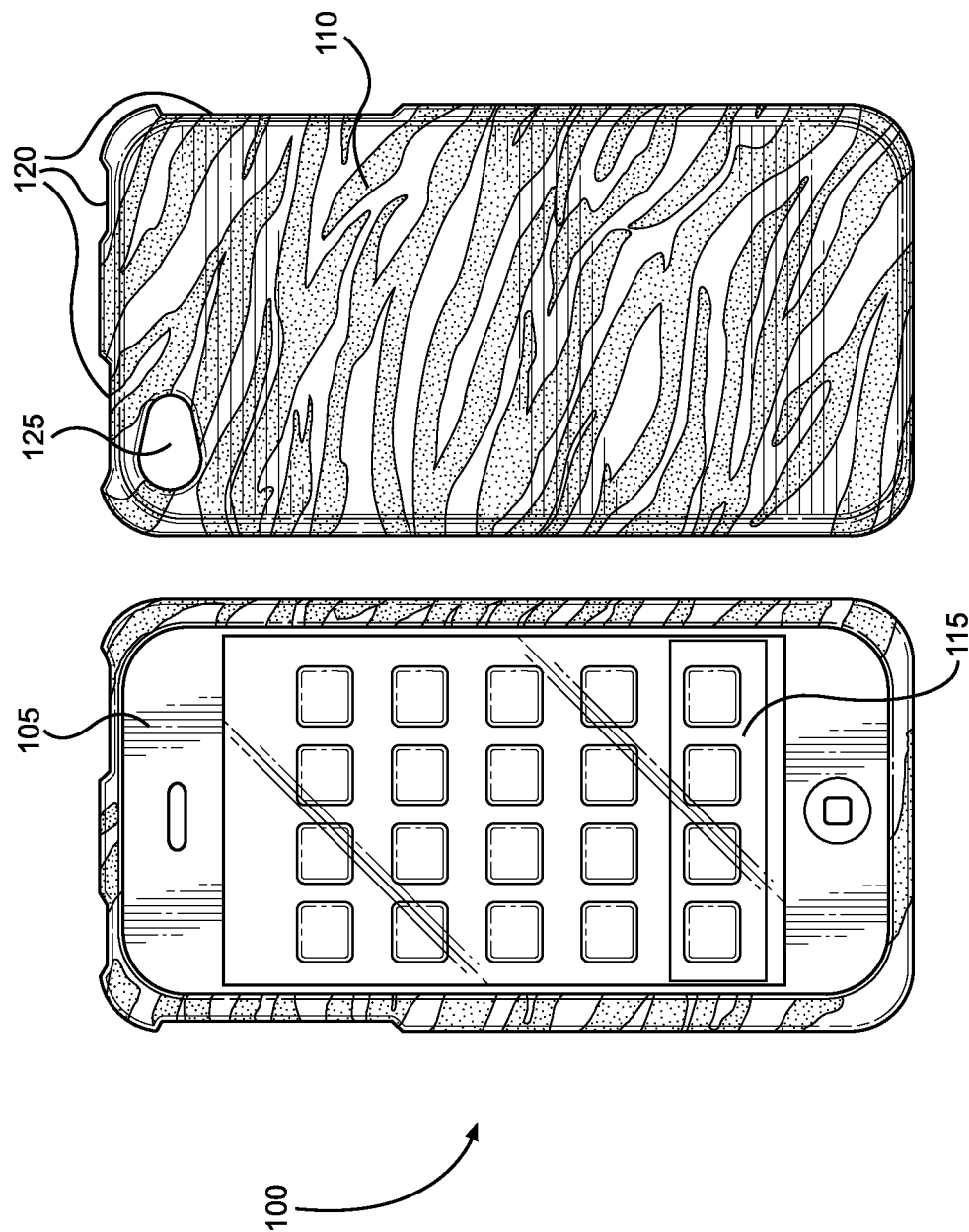
FIG. 1 shows perspective front and back views of a prior art PED case for use with a smarthphone.

The present invention will now be described more fully with reference to the accompanying drawings. It should be understood that the invention may be embodied in many different forms and should not be construed as limited to the embodiments set forth herein. Throughout FIGS. 1-6, like elements of the invention are referred to by the same reference numerals for consistency purposes.

FIG. 1 shows perspective front and back views of a prior art PED case 100 for use with a smarthphone, which in this view is an iphone® made by Apple. Case 100 is typically made of mold-injected plastic or rubber formed to the shape of a PED 105 with an ornamental design printed on it, which for case 100 as shown is a zebra pattern 110. The mold may be flat or include raised and other textured portions for tactile feel and/or to add aesthetics that appeal to the user. Case 100 has different shaped cut out areas for the front side of PED 105 to view screen 115, as well as other cutouts 120 along the sides for buttons and a cutout 125 on the back for a camera lens. Case 100 is typically formed so that PED 105 fits snugly within case 100 and does not easily fall out. It may require a twist or a bending motion at the edge of case 100 to "pop out" smartphone 105. In that way, even if PED 105 is dropped or stepped on, PED 105 will not be accidentally extracted from case 100 during such an event, exposing it to a higher risk of damage.

Figure 2:
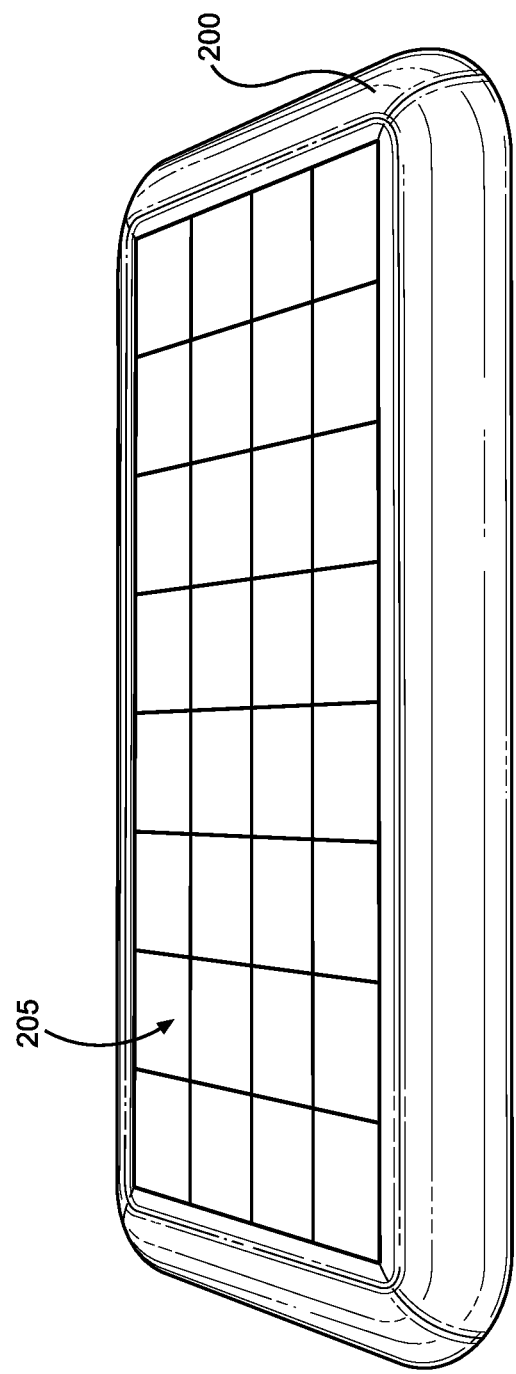
FIG. 2 is a perspective view of a PED case in accordance with the present invention.

FIG. 2 is a perspective view of a PED case 200 in accordance with the present invention. PED case 200 is similar to prior art case 100 in its basic construct, but it is outfitted with an electroluminescent panel ("ELP") 205 that is affixed to, embedded in or otherwise situated in or on a portion of the exterior surface of case 200. It should be understood that ELP 205 may be any shape or size and there may be one or more ELPs 205 used for a particular case 200. In the example shown in FIG. 2, ELP 205 is a rectangular shape covering most of the backside of case 200. However, ELP 205 may instead be formed of one or more strip-shaped ELPs that are affixed to case 200 anywhere on the backside, along the sides, or across any portion up to the edge of case 200. ELP 205 is an electroluminescent panel that is capable of displaying light patterns across its external surface. ELP 205 is flexible to fit to the shape of case 200 while being extremely durable and thin enough to avoid adding bulk or additional size to the dimensions of case 200 when affixed to it. The depth of ELP 205 is in the range of approximately 0.05 mm-2.0 mm.

ELP 205 is made of indium tin oxide ("ITO") films with layers of phosphor inks. ELP 205 includes separate circuits that are illuminated independently from one another and are represented by the matrix of rectangular sections shown in FIGS. 2-4. ELP 205 may also incorporate LED, OLED, fiber optics and other light technologies. The design and manufacture of ELPs of various types is well known in the art. In one typical configuration, a top sheet that is translucent or transparent and bottom sheet that is translucent, transparent or solid. The bottom sheet is made of a flexible conductive material. The top sheet and bottom sheet act as an anode and a cathode. Between the two sheets is sandwiched electroluminescent ink printed in any pattern that may be circuit dependent or independent. The ink patterns are linked to form one or more circuits. ELP 205 is affixed to the exterior surface of case 200 by adhesive such as glue, hook and loop fastener, adhesive tape or any other adherent that functions to hold ELP 205 to case 200. It can also be fastened to the case using a lens as a lid. The lens will be placed over the ELP and act as a second form of protection. This application of a lens will allow the ability for the user to create their own unique image on a printer and place this under the lens for a custom look.

Figure 3A:
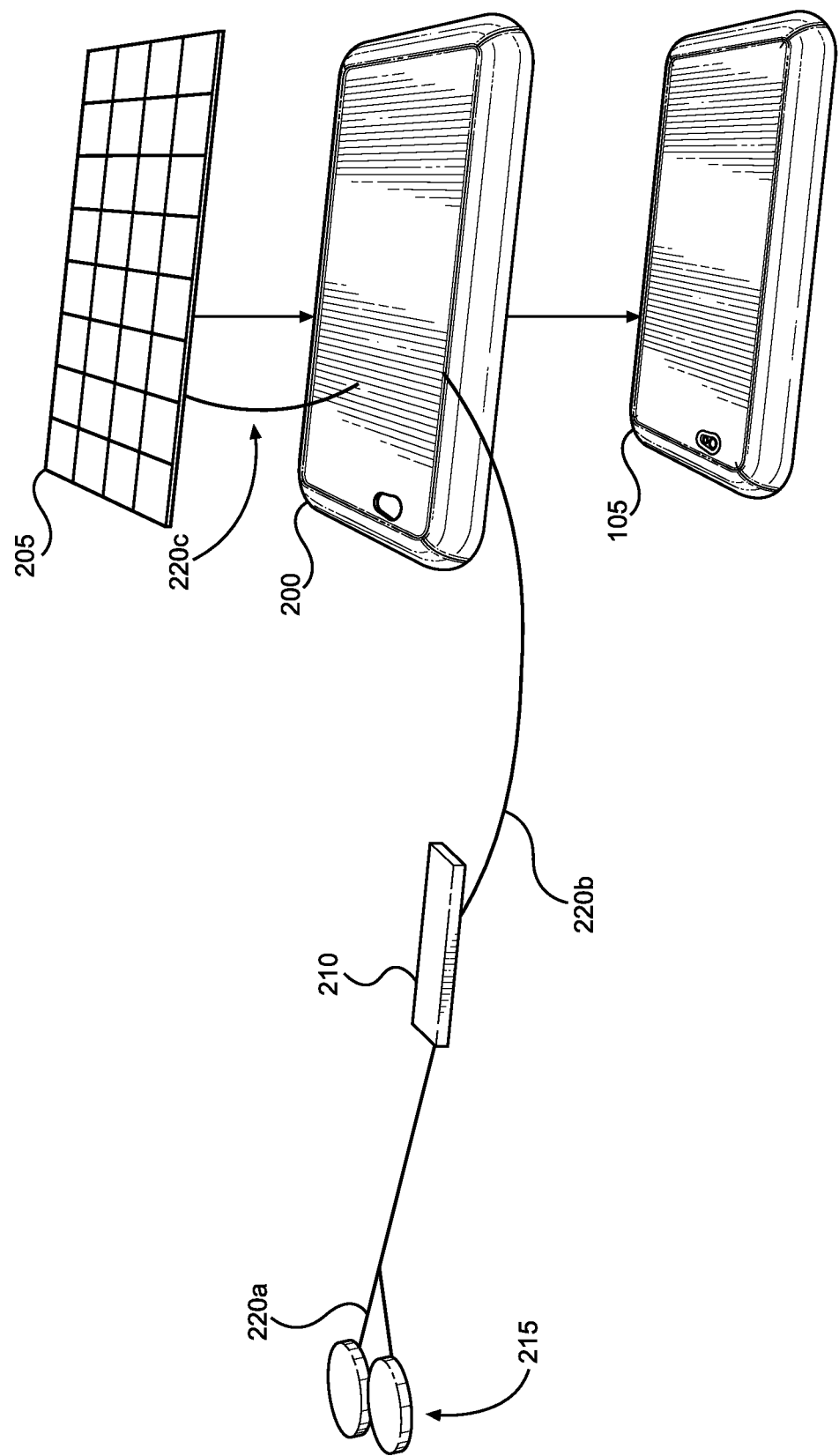
FIGS. 3A-B are perspective views of a PED case of the present invention showing individual components.

In addition to ELP 205, case 200 also includes a set of electronics that control and power ELP 205 shown in FIG. 3A. ELP controller 210 is a microprocessor based control circuit, which may be, for example a HV816 manufactured by Supertex of Sunnyvale, Calif. A power supply 215 which is typically in the form of one or more rechargeable batteries provides power to controller 210 and to ELP 205 through a set of wires 220a-c. The battery may be, for example a 3.7 volt lithium polymer battery with a capacity of 700-1,800 mah. Power supply 215 will be chargeable through a standard USB port (see FIG. 4) on controller 210. It should be understood that other battery types may be used to provide power, such as a button power cell referred to as CR2032 that are known in the art. Lithium ion rechargeable batteries may be used that use typical wired charging, or inductive or other wireless charging capabilities. These individual circuits of ELP 205 are connected by wire 220 and/or by conductive ink which may be in the form of printed circuitry to receive power from power supply 215 and control signals from controller 210.

Figure 3B:
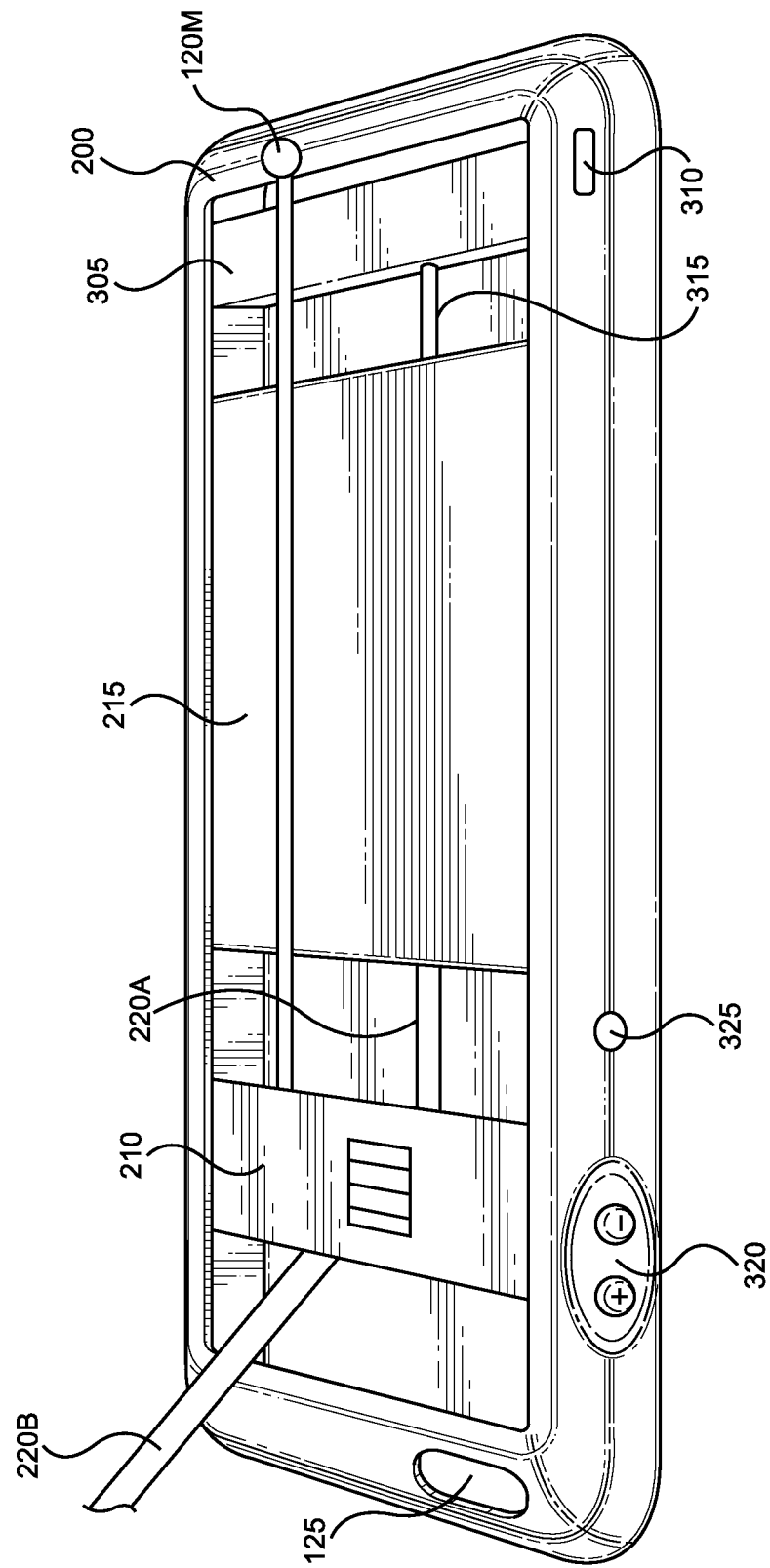

FIG. 3B is a perspective view of case 200 showing the recessed area into which a PED such as an iPhone fits. Embedded in the bottom of case 200 are the electronic components including ELP controller 210, power supply 215 and charging circuit 305 for charging power supply 215. Charging circuit 305 includes a port such as a mini-USB port 310 in the side of case 200 where a charger cord may be plugged in to charge power supply 215. Charger circuit 305 is connected to power supply 215 by a cable 315. Cable 220B, which may be a ribbon cable is connected between ELP controller 210 and ELP 205 (not shown) on the back side of case 200. Button covers 320 matching up with buttons on a PED, or in the alternative a cutout 120, allow a user to access buttons on PED even while case 200 is in place. A cutout 120M is adjacent to microphone 410 (see FIG. 4) to allow sound or vibration to pass through case 200 and to microphone 410 on ELP controller circuit 210. One or more switches 325 may be used to operate the various functions of ELP controller 210 including switching ELP 205 on and off and sequencing through different illumination pattern sequences.

ELP controller circuit 210, power supply 215, charging circuit 305 and cables 220 as shown in FIG. 3B are thin enough to be embedded in the back side material that form case 200. In this way, case 200 protects the components from the environment while still enabling ELP 205 to be controlled and powered on the surface of case 200. ELP 205 may also be laminated or otherwise covered with a plastic lens to increase durability and prevent ELP 205 from getting dirty or otherwise being damaged.

Figure 4:
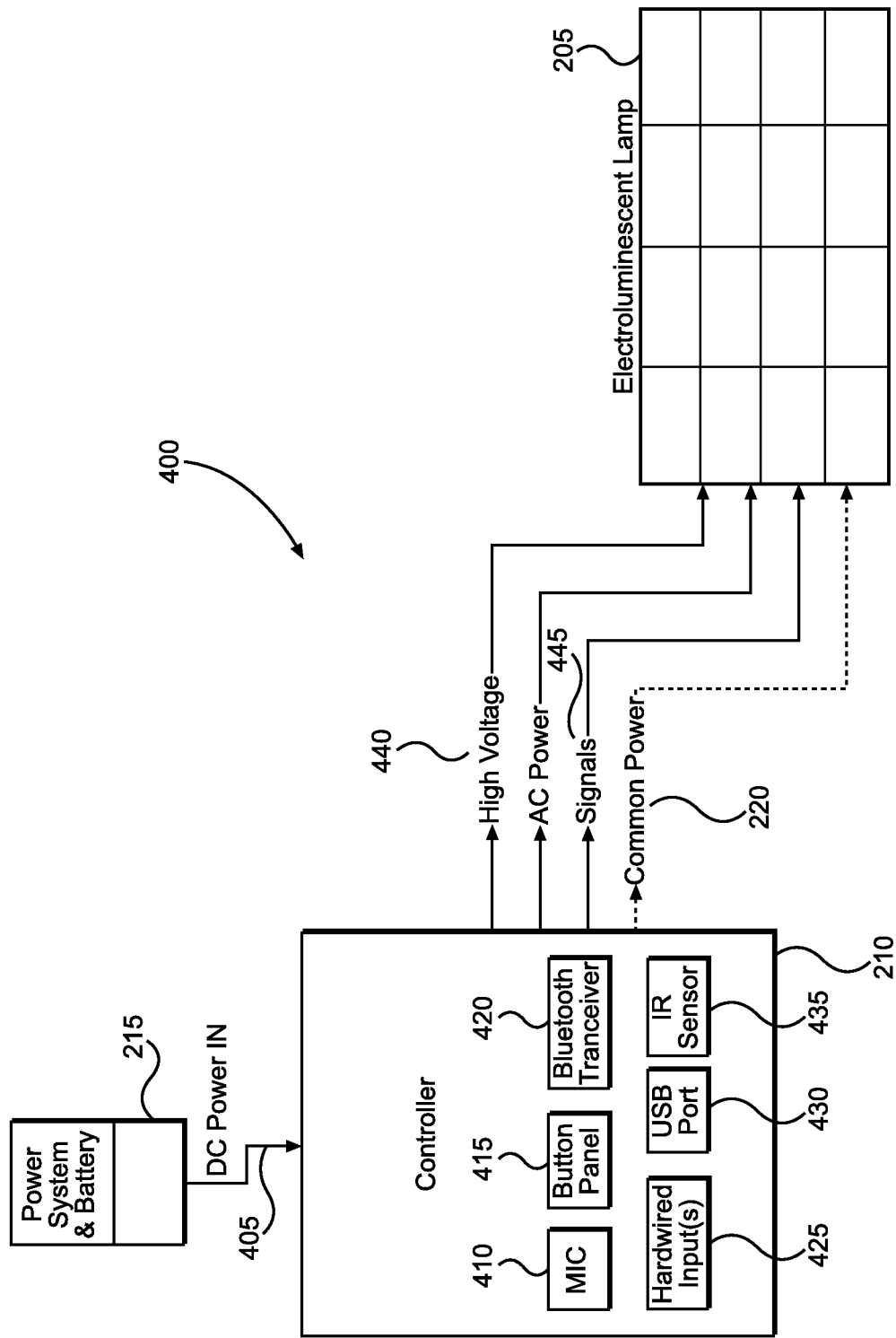
FIG. 4 is a system block diagram of the PED case of the present invention.

FIG. 4 is a system block diagram of system 400 for use with case 200. Controller 210 has a number of inputs and outputs. The inputs include a DC power line 405 from power supply system 215. A microphone 410 is used to pick up sounds and vibrations that may be used to formulate different light patterns on ELP 205. A button panel 415 may be used by the user to input information, make selections or to perform other interactive operational functions on system 400. A Bluetooth transceiver 420 is also included to permit reception of signals from a device such as the user's PED residing in case 200 or any other device with Bluetooth capabilities. Using Bluetooth communications, signals transmitted by PED 105 may be received by Bluetooth transceiver 420 and converted to signals to formulate light patterns on ELP 205. Other inputs may include one or more hardwired inputs 425 that are hardwired to PED 105 or another device, a USB port 430, IR sensor 435 and any other electronic inputs that may be desired by the system designer. For some cases, including for example, a laptop case, controller 210 will may be connected through the USB port to supply power. The USB port can power the unit and also provide an interface for manipulating operation of ELP 205. This will allow for direct audio output signal, programming and power.

Outputs from controller 210 include DC power line 220 and high voltage AC line 440 which may be used as an alternative source of power for ELP 205 on DC line 220. A DC line out (not shown) may also be included to power one or more LEDs or other components. A set of ELP signal lines 445 is used to send signals from controller 210 to ELP 205 providing instructions to ELP 205 as to what light panels to illuminate at any given time.

Figure 5:
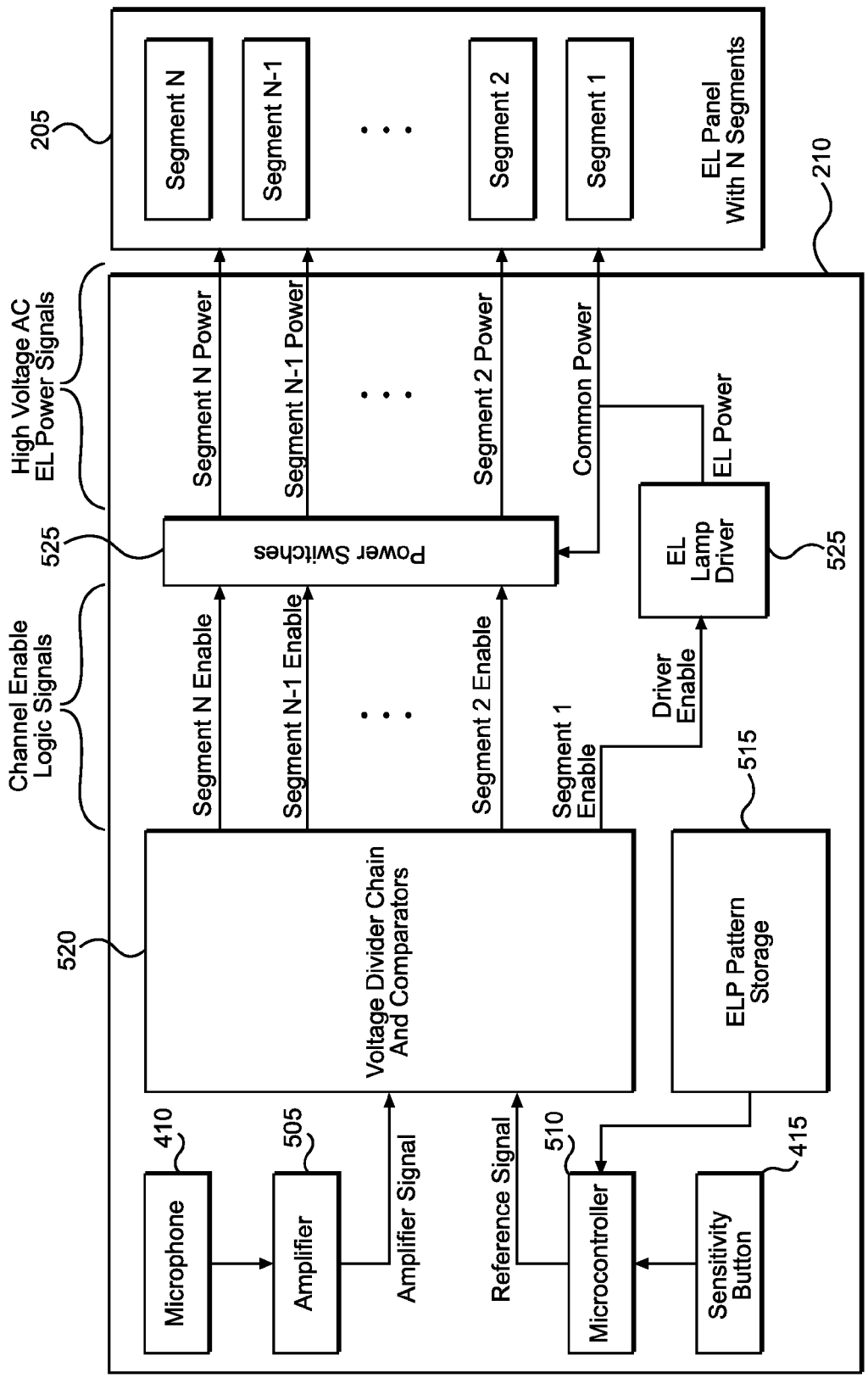
FIG. 5 is a block diagram of the circuit components and signal paths of the PED case of the present invention.

FIG. 5 is a block diagram of the circuit components and signal paths of system 400 of the present invention. Microphone 410 and/or a sensitivity button on button panel 415 receive input signals in the form of sound or vibration on microphone 410 or a user input on button panel 415. Sound or vibration signals are amplified by amplifier 505 and inputs on button panel 415 are sensed by microcontroller 510. Alternatively, or supplementally, an ELP pattern storage device 515 in the form of a memory may hold pre-programmed ELP illumination pattern sequences or ELP illumination pattern sequences programmed or customized by a user that are input to microcontroller 510. For any of the signals from microphone 410, button panel 415 or ELP storage 515, the signals may be used to generate a sequence of illumination patterns on ELP 205. The signals from any of these inputs are input to a voltage divider 520 which may be a comparator of the type manufactured by Fairchild Semiconductor of San Jose, Calif. such as model number LM339 or LM339A. Voltage divider 520 receives the input signals and divides them into a set of segment enable signals (1-N) corresponding to each of the segments (1-N) on ELP 205. Each individual segment enable signal is transmitted through an electroluminescent lamp ("EL") driver 525, also referred to as a power switch, to provide a power signal to the corresponding EL segment in ELP 205. The set of segment enable signals being transmitted through to segments 1-N of ELP 205 causes ELP 205 to display a timed pattern sequence. It should be understood that a microprocessor could be used instead of a comparator to receive the audio signals and convert them into different patterns for illumination on ELP 205.

Any individual sequence may be played one or more times in repetition, or combined with other live signals or pre-configured pattern signals to illuminate ELP 205. In one embodiment of the invention, using microphone 410 as the input to receive sound signals in the form of a song played on PED 105 will cause ELP 205 to respond to the music and "play" the song as it is being received in a particular light pattern reflecting the voltage divisions performed by voltage divider 520, which may be selected as desired by the system designer. Alternatively, any sounds produced will similarly trigger ELP 205 to respond with illumination patterns.

FIG. 6A is a diagram showing one sample layout of ELP 205 in the shape of a target with 5 concentric segments where each concentric segment is an individual circuit 605A-E. Each circuit 605 is controlled separately by controller 210 and the five circuits may be illuminated in succession or in any other chosen pattern. A representative pattern may be to light up the individual circuits in the following timing pattern where $T_n$ is the sequential timing of the illumination: $T_1$: A alone; $T_2$: A+B; $T_3$: A+B+C; $T_4$: A+B+C+D; $T_5$: A+B+C+D+E. This pattern will create an image of the target extending out over the segments to be fully lit at time, $T_5$. It should be understood that the target is a simple ELP print pattern that may be created by the designer, and ELPs of differing levels of complexity may be manufactured with different colors of ink and any number of individual circuits to make illuminated patterns more versatile, aesthetically pleasing and fun. In addition, the density of "pixels" can be varied with cost increasing as the pixel density and count increases. In addition, the greater the number of ELP circuits 605, the greater the cost.

FIG. 6B is a diagram of a rectangular ELP 205 showing another sample layout for individual ELP circuits 605A-E. As with the circular target shape of FIG. 6A, each circuit 605 is controlled separately by controller 210 and the five circuits may be illuminated in succession or in any other chosen pattern.

In addition to the printed ink patterns on ELP 205, light emitting diodes ("LEDs") may also be used in combination with the ELP circuits 605 to add to the illumination patterns.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined with reference to the claims.

What is claimed is:

1. An apparatus in the form of removable case for an electronic device, wherein the electronic device has a first power supply, the removable case comprising:
   a semi-rigid material formed with a substantially flat surface having an exterior area with at least two opposing sides approximately perpendicular to the flat surface, the flat surface and the sides forming a recessed interior area having a shape corresponding to the exterior dimensions of the electronic device such that the electronic device fits securely within the recessed interior area and is held in the recessed area between the substantially flat surface and the at least two opposing sides;
   an integrated control circuit embedded within the material of the substantially flat surface, the integrated control circuit comprising:
      a controller for receiving input signals and generating ELP signals based on the input signals;
      a second power supply, independent of the first power supply, connected to the controller for supplying power to the integrated control circuit; and
      an input in communication with the controller for providing the input signals to the controller, wherein the input signals are generated by a source; and
   an electroluminescent panel ("ELP") affixed to the exterior area of the substantially flat surface, the ELP including a plurality of segments in communication with the integrated control circuit wherein the ELP receives ELP signals based on the input signals from the controller causing the segments to be illuminated in a pattern corresponding to the ELP signals.

2. The apparatus of claim 1 wherein the input comprises one or more from the group comprising: (a) a microphone for sensing sound or vibration; (b) one or more buttons for receiving input from a user; (c) a memory in the integrated control circuit for storing and providing ELP pattern signals; or (d) an input signal received from an external source.

3. The apparatus of claim 1 wherein the integrated control circuit further comprises a wireless input for receiving input signals wirelessly from an external source.

4. The apparatus of claim 1 wherein the input is a microphone for detecting sound or vibration that may be converted to input signals.

5. The apparatus of claim 1 wherein the input is a memory for storing at least one illumination pattern that may be converted to input signals.

6. The apparatus of claim 1 further comprising at least one LED affixed to the exterior surface of the material and in communication with the integrated control circuit wherein the LED receives LED signals from the controller causing the LED to be illuminated.

7. The apparatus of claim 1 further comprising a switch connected to the integrated control circuit and for providing control of the integrated control circuit.

8. The apparatus of claim 1 further comprising a charging circuit for charging the power supply when connected to an external power source.

9. The apparatus of claim 1 wherein the input is a port for receiving signals from an external source.

10. The apparatus of claim 1 wherein an exposed surface of the ELP is overlayed by a transparent protective cover.

11. A method of operating removable case for an electronic device, wherein the electronic device has a first power supply, the removable case comprising:
    providing a semi-rigid material formed with a substantially flat surface having an exterior area with at least two opposing sides approximately perpendicular to the flat surface, the flat surface and the sides forming a recessed interior area having a shape corresponding to the exterior dimensions of the electronic device;
    receiving the electronic device into the interior area securely between the substantially flat surface and the at least two opposing sides;
    activating an integrated control circuit embedded within the material of the substantially flat surface, wherein the integrated control circuit comprises:
       an input configured to receive input signals generated by a source;
       a controller for receiving the input signals from the input; and
       a second power supply, independent of the first power supply, connected to the controller for supplying power to the integrated control circuit;
    receiving the input signals at the controller from the input;
    generating ELP signals using the controller based on the input signals received;
    transmitting the ELP signals to an electroluminescent panel ("ELP") affixed to the exterior area of the substantially flat surface of the material causing a plurality of segments in the ELP to be illuminated in a pattern in response to the ELP signals.

12. The method of claim 11 wherein the input comprises one or more from the group comprising: (a) a microphone for sensing sound and vibration; (b) one or more buttons for receiving input from a user; (c) a memory in the integrated control circuit for storing and providing ELP pattern signals; or (d) an external source.

13. The method of claim 11 wherein the integrated control circuit further comprises a wireless input for receiving input signals wirelessly.

14. The method of claim 11 wherein the integrated control circuit further comprises an input in the form of a microphone for detecting sound or vibration that may be converted to input signals.

15. The method of claim 11 wherein the integrated control circuit further comprises an input in the form of a memory for storing at least one illumination pattern that may be converted to input signals.

16. The method of claim 11 further comprising at least one LED affixed to the exterior surface of the material and in communication with the integrated control circuit wherein the LED receives LED signals from the controller causing the LED to be illuminated.

17. The method of claim 11 wherein the integrated control circuit further comprises a switch for providing control of the integrated control circuit.

18. The method of claim 11 further comprising charging a power supply connected to the integrated control circuit that provides power to the integrated control circuit enabling operation.

19. The method of claim 11 wherein the integrated control circuit further comprises a port for receiving signals from an external source.

20. The method of claim 11 wherein an exposed surface of the ELP is overlayed by a transparent protective cover.

\* \* \* \* \*